US012299684B2

(12) United States Patent
Benkreira et al.

(10) Patent No.: US 12,299,684 B2
(45) Date of Patent: May 13, 2025

(54) SYSTEMS AND METHODS FOR DIGITALLY ISSUED LOYALTY ENROLLMENT

(71) Applicant: Capital One Services, LLC, McLean, VA (US)

(72) Inventors: Abdelkader Benkreira, Washington, DC (US); Tyler Maiman, Melville, NY (US); Brendan Way, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 370 days.

(21) Appl. No.: 17/589,044

(22) Filed: Jan. 31, 2022

(65) Prior Publication Data

US 2023/0245123 A1 Aug. 3, 2023

(51) Int. Cl.
*G06Q 20/00* (2012.01)
*G06F 21/62* (2013.01)
(Continued)

(52) U.S. Cl.
CPC ..... *G06Q 20/4014* (2013.01); *G06F 21/6263* (2013.01); *G06Q 20/3278* (2013.01); *G06Q 30/0226* (2013.01); *G06Q 30/0609* (2013.01)

(58) Field of Classification Search
CPC ..... G06Q 30/02–0277; G06Q 20/4014; G06Q 20/3278; G06Q 30/0609; G06Q 30/0226; G06F 21/6263
See application file for complete search history.

(56) References Cited

U.S. PATENT DOCUMENTS

| 2011/0047463 A1* | 2/2011 | Shepherd | G06Q 10/10 |
| | | | 715/723 |
| 2012/0166270 A1* | 6/2012 | Coppinger | G06Q 30/0239 |
| | | | 705/14.36 |

(Continued)

FOREIGN PATENT DOCUMENTS

WO   WO-0139053 A2 *   5/2001   ............. G06Q 30/02

OTHER PUBLICATIONS

Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206. (Year: 2005).*

*Primary Examiner* — Raquel Alvarez
(74) *Attorney, Agent, or Firm* — HUNTON ANDREWS KURTH LLP (57) ABSTRACT

Systems and methods for implementing an auto-pause functionality for recurring payment transactions that continue to be charged, despite being associated with an unavailable merchant service as mandated by a public closure restriction. One operational aspect of the disclosed system/method is active detection of a possible closure condition based on monitoring a ratio of on-line (Card Not Present) to in-person (Card Present) transactions, internally computed over several time windows. The outcome of the ratio test falling below a predefined value is indicative of a possible public closure condition. There is an external verification step based on externally provided information associated with a published closure notification. Disclosed process further involves an indexing operation for parsing and tracking of recurring transaction string data to facilitate the identification of invalid recurring transaction strings, once a public closure condition is verified.

22 Claims, 6 Drawing Sheets

(51) Int. Cl.
*G06Q 20/32* (2012.01)
*G06Q 20/40* (2012.01)
*G06Q 30/0226* (2023.01)
*G06Q 30/0601* (2023.01)

(56) References Cited

U.S. PATENT DOCUMENTS

2015/0019317 A1 1/2015 Mitchell
2018/0174130 A1 6/2018 Shroff et al.
2019/0066147 A1* 2/2019 Jain .................... G06Q 30/0238

* cited by examiner

SYSTEMS AND METHODS FOR DIGITALLY ISSUED LOYALTY ENROLLMENT

FIELD OF THE DISCLOSURE

The present disclosure relates to systems and methods for automated verification of electronic transactions, and more specifically to a system/method for circumstance-triggered validation of recurring payment transactions.

BACKGROUND

Merchants often offer loyalty programs to draw additional business value from their clients/customers. Such a merchant loyalty program, for example, may offer registered users certain rewards (e.g., various discounts on select merchandise) based on, for example, user's purchasing activity/history with the merchant with the intent of encouraging repeat business. Such merchant rewards may also be provided, for example, in exchange for information from the user that may be utilized towards marketing purposes. Given that consumer and merchant interactions are increasingly being conducted via card-based and card-less electronic transactions, there is a need for a dynamic implementation of digitally issued merchant loyalty that is responsive to appropriate user activities and circumstances.

SUMMARY OF THE DISCLOSURE

Embodiments of the present disclosure are directed to a method for location-based digitally issued loyalty enrollment. The proposed method comprises monitoring information generated by a Global Positioning System (GPS) application stored on a user's mobile device to determine a location of a merchant being visited by the user. Upon confirming information generated by the GPS application as corresponding to a merchant location, the proposed method initiates verification of a user's loyalty status using one or more API calls to an appropriate merchant database system. If no matching entries is located that corresponds to the user, the user may be notified via actionable notification generated to initiate a registration process and transmitted to a mobile device of the user. Upon receiving confirmation from the user, relevant user identifying information may be prepared, encoded and transmitted to the appropriate merchant server/system for automatic creation of a merchant-specific loyalty account and generation of a digital loyalty card for the user, on behalf of the merchant, wherein the digital loyalty card may be transmitted to the application running on the user's mobile device. If an existing entry corresponding to the user identifying information is already present in the merchant database, one or more notifications with regards to existing loyalty/rewards points may be transmitted to the user's device to be communicated with the user. In accordance to some embodiments, determining a user's location-based intent (e.g., user's location overlaps with a merchant store location) further comprises processing information from a variety of other sources in addition to the Global Positioning System (GPS) data retrieved from a mobile navigation application running on a user's mobile device. For example, information from pairing with a Bluetooth beacon device at a merchant location and/or a parking transaction in proximity of the merchant location may be used as supplementary data to ascertain a user's location-based intent.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure regards a digitally issued store loyalty notifications and account processing that are triggered dynamically when a customer is detected as walking into a merchant store that offer one or more loyalty programs.

Another aspect regards a process for dynamically triggered (e.g., responsive to a user locality computations) detection of a user loyalty status with respect to a geographically identified merchant facility or service-location. Upon walking into a merchant store, the user may be dynamically notified about their merchant-specific loyalty status and rewards points. Some aspects may involve for example, an application running on a mobile computing device associated with the user, that may be configured to receive one or more push notifications and/or a sign-up flow to facilitate the user loyalty registration process. In some embodiments, one or more enrollment notifications, for one or more merchant-specific loyalty programs, may be dynamically provided to the user (e.g., based on geographical mapping of a user's real-time location) via one or more text messages or emails.

One aspect of the proposed system/method may regard accurate identification of a merchant service-location that corresponds with real-time location of the user. In some embodiments information provide by a Global Positioning System (GPS) (acquired through one or more navigation applications that may be running on a user's mobile device)

may be used to determine when a user/customer enters a specific merchant's store. As described above, a process may be automated to identify user's loyalty status with the merchant and automate one or more actions to provide automatic utility to a user with regards to merchant's loyalty service, while providing merchants with processed user-related information, that may be based on tracking and analysis of user purchasing habits/activities, and thus have a business value for the merchant.

According to some embodiments, a user may dynamically receive one or more notifications about their exiting merchant-specific loyalty status upon walking into the respective merchant store). In accordance to some embodiments, the notifications may be in form of one or more push notifications or a sign-up flow in case no existing loyalty account is located in the merchant system that corresponds to the provided user identifying information. In accordance to some embodiments, the dynamically generated notifications may be transmitted to a corresponding application running on a mobile device of the user.

In order to improve a reliability of detecting a user's presence at a known merchant location, some embodiments involve collecting user-related data from various distinct sources to improve a mapping of a user's geographical location to a merchant service/facility location. For example, data obtained from a GPS application running on a user mobile device, may be supplemented with information from, for example, a Bluetooth beacon communicating with a Bluetooth process on a user mobile device, and/or any other smart device pairing operation that may be conducted with one or more Bluetooth or Near Field Communication (NFC) enabled devices associated with the user. Some embodiments may collect and process information associated with, for example, parking transaction records generated within a predefined time window for supplementing user's GPS location data. This may improve the accuracy of detecting a user's geographical/physical presence at a merchant location.

In accordance to some embodiments, the automation of the user registration step in the automated loyalty enrollment process may involve one or more confirmation/verification steps with the user at one or more points along an automation flow of the process. For example, user registration process may automatically be carried out upon receiving a confirmation response to, for example, a push notification transmitted to the corresponding application on the user's mobile device. Upon receiving a user confirmation, appropriate information may be directly provided to a merchant account server for creation of a new user loyalty account.

Some embodiments of the present disclosure are directed to an improved automation framework for digitally issued loyalty rewards that is triggered upon detection of user presence at the merchant location. The detection is carried out, in accordance to some embodiments, by using a variety data sources (e.g., device pairing data with a specific beacon or reader installed at or in proximity of a merchant facility) to supplement a GPS application data with regards to a establishing a user's geographical location and intent.

Some embodiments may involve an automated loyalty enrollment/notification service that is triggered by a purchase at a merchant offering one or more loyalty programs. In accordance to this embodiment, a presence of a user at a target merchant is detected based on dynamically acquired user transaction information (e.g., retrieved in real-time or near real-time.) Information from a transaction string generated in connection with a purchase at the target merchant may then be used to identify the target merchant and trigger the automated process involving loyalty-related information exchange between a user device running an appropriate application (and/or a corresponding application server) and one or more merchant systems/servers. Accordingly, in some embodiments, identification of a target merchant and initiation of the automated process is carried out based on dynamically obtained transaction information. The automated process may, for example, involve establishing a communication link with the appropriate merchant system (e.g., a loyalty accounts information database) across which, one or more merchant-specific loyalty notifications or enrollment requests may be transmitted to the mobile device of the user.

A merchant may select what user identifying data element (s) a loyalty account may be tied/assigned to. Various options may include, a user's name and address information, a designated email address and/or phone number, a payment card or account number, etc. For example if a one loyalty account per user policy is preferred, a respective merchant may use loyalty account assignment options corresponding, for example, to a payment card information, or any other user-specific information uniquely associated with the user (e.g., last four digits of a social security card).

One aspect of the proposed system/method may regard a location-triggered process for dynamic identification of a user's loyalty status with respect to merchant service/facility being visited by the user (e.g., merchant location geographically overlaps with a computed user location). In some embodiments, identification may require searching through one or more merchant databases for a matching user-specific information to determine the existence of loyalty account and associated digitally issued reward points. The searching operation may be conducted, by a merchant server, based on user identifying information provided by the mobile application or a corresponding application server. In some embodiments, the searching operation and search results maybe be provided by a third-party service with access to appropriate databases (e.g., storing merchant-specific loyalty accounts information.) In some embodiments, the searching operation may be carried out by one or more application processes stored on the mobile device and/or the corresponding application server.

In accordance to some embodiments, the dynamically triggered loyalty/reward automation may be optimized to be less computationally intensive by initiating the searching operation if an analysis of recorded user transaction activity, with respect to the identified merchant, (e.g., past transaction frequency and amounts during a specified time window) indicates a good likelihood of a loyalty account existing— The analysis may take into account additional information such as historical and real-time GPS data in deciding whether to search for existing loyalty account or to generate a new enrollment notification directly (based on determining a low likelihood of an existing loyalty account at the merchant, for example, by analyzing recent user transaction activity at the merchant.) Recent transaction activity may correspond to transactions occurring within one or more pre-defined time windows.

As discussed above, identification of an existing loyalty account may comprise, providing one or more (user-specific) data elements that uniquely identifies the user to facilitate a search for matching information in a specific merchant database (e.g., a data storage for storing information on various user loyalty accounts). The one or more user-specific data elements may uniquely identify a user while safe-guarding sensitive information and user privacy. Accordingly, some embodiments involve providing only a portion of a user identifying data element (such as first four letters of a name, or a digits of a phone number) for matching against exiting user information. According to some embodiments, user identifying information provided for the purpose of identifying an existing user account and/or creating a new user loyalty account, may be partially obscured such that it may still be used as a unique identifier while protecting sensitive user data and user privacy.

In some instances, a merchant may offer loyalty/reward points and/or one-time discounts in an exchange for collecting consumer-related data that has some marketing value. In accordance to some embodiments, the exchange of digitally issued loyalty offers/discounts for consumer-related information may occur dynamically as the user enters a merchant store or as the user conducts a transaction at the merchant. In certain embodiments, the aforementioned exchange of information may be contingent upon real-time authorization by the user.

As such in addition to user identifying information, user-related information with marketing value (e.g., information with respect to a user transactional/purchasing behavior and tendencies) may be provided, for example, in exchange for greater reward values (e.g., loyalty offers associated with a greater financial reward). However, providing information about specific user transaction, for example by providing a portion of raw transactional data record, maybe considered a violation of user privacy, as well as being of low utility for the merchant (e.g., with regards to providing any insight into transaction pattern of the user that can be used for marketing purposes). As such, in accordance to some embodiment, one or more internal processes may be associated with conducting a statistical analysis of user transactional information (e.g., using archived and/or real-time transaction records and other electronic activities) to provide processed user information, that carries insight into users transactional/purchase trends, while being of lower privacy concern to the user.

Some embodiments of the present disclosure are directed to providing processed user information, by conducting an internal analysis of user transactional activity pattern, as part of an automated loyalty detection/generation scheme. The processed user information may, for example, include one or more computed probabilities and statistical parameters associated with a user's transactional activity patterns. For example, one or more machine learning routines may be applied to compute a probability score corresponding to a likelihood of the user switching from a competitor brand. Other scores may indicate probability of staying with a competing brand. Another example of processed user information may include a probability score representing a likelihood that a user will transact in person or on-line. This may, for example, be gleamed from an analysis of user navigation data and transactional records, and a utilized, for example, to optimize targeting of digitally issued rewards/promotions.

Therefore, in accordance to some embodiments, an expanded range of data sources may be used for analyzing user behavior and generating processed user information (that, because of its marketing value, may be leveraged for greater rewards value.) One embodiment involves collecting and analyzing user transaction information from various distinct financial institutions that may be linked to a user's transactional/spending activities. By integrating a broader range of electronically tracked transactional information associated with various financial instruments of the user, a more comprehensive tracking of user's transactional patterns may be achieved. This results in a processed user information that is of greater business value to a merchant, which, for example, may also result in an increase in the financial rewards associated with a provided loyalty offer.

One such set of supplementary data sources, as discussed above, may involve the various browser extensions for collecting and analyzing user online interaction/browsing pattern. An example of processed user information may quantify a user's purchase intent or probably of purchase with respect to a particular merchant service/product. As described, processed user information may be generated based on analyzing user transactional records that may be further supplemented by information provided by one or more data collection/processing applications and/or browser extensions (e.g., for tracking online browsing activities to identify targeted advertisements) that may be stored on a user's computing/mobile device.

Figure 1:
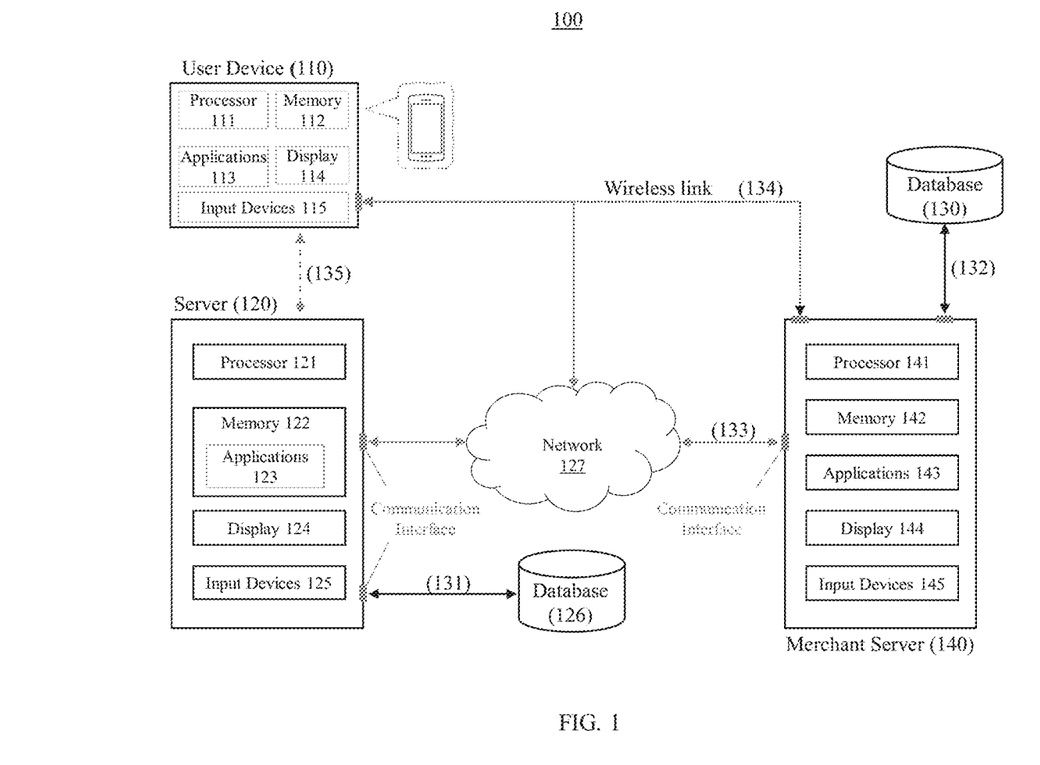
FIG. 1 is an exemplary implementation of a system for electronic royalty-related notifications and signup flows automation based on detection of a user geographical location, in accordance to some embodiments of the present disclosure.

FIG. 1 illustrates an exemplary system 100 for dynamically triggered exchange of digital merchant-specific loyalty/reward data responsive to a determination of a user geographical location, according to an example embodiment. As further discussed below, the system 100 may include a user transmitting device 110 (mobile/computing device), a server/application server 120, a database 130, and a merchant server 140 that may be configured to wirelessly couple with the user device 110, based on proximity sensing (e.g., using device pairing protocol such as Bluetooth, NFC, etc.). With reference to FIG. 1, communication between different components may also take place through network 127. Although FIG. 1 illustrates single instances of each components, the system 100 may include any number of components.

The user mobile/computing device 110 may be configured with one or more application 113. Applications 113 may comprise for example, a web browser with one or more browser extensions, one or more data collecting applications, a navigation or GPS application and an application for location-triggered processing/automation of merchant-specific loyalty rewards. A user may communicate with the server 120 in response to one or more authorization/verification requests. The device may receive data to be displayed and replied to (e.g., one or more reward/loyalty related notifications and/or automated sign up flow) from a merchant server through network 127. In some embodiments the data may be received by sever 120 and transmitted to the user device 110. In some embodiments, loyalty-related messages may be communicated between user device 110 and one or more loyalty accounts management severs 140, directly through a wireless link 134. The user device 110 may be configured to transmit one or more user-related data to the server 120. The user-related data may correspond to one or more user-identifying information stored on the device and/or real-time captured user response to an actionable notification. The server 120 may be configured to receive data from user device 110 and facilitate communication with the merchant server 140 as indicated by the user response to one or more authorization requests and loyalty notifications. The merchant system (140) may be communicatively coupled to a database 130 which may store information on different user loyalty accounts with the merchant. In some embodiments, database 130 may be a publicly accessible database storing user loyalty account information associated with a plurality of merchant.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and one or more applications 113. The processor 111 may be a processor, a microprocessor, or other processor, and the first user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The applications 113 may comprise one or more software applications, such as a mobile application and a web browser, comprising instructions for execution on the user device 110. In some examples, the first user device 110 may execute one or more applications, such as software applications, that enable, for example, network communications with one or more components of the system 100, transmit and/or receive data, and perform the functions described herein. Upon execution by the processor 111, one or more applications from applications 113 may provide the functions described in this specification, specifically to execute and perform the steps and functions in the process flows described below. Such processes may be implemented in software, such as software modules, for execution by computers or other machines. The one or more application may further provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the applications 123, and other data, such as user's private data and financial account information.

The applications 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may be executed to facilitate exchanging of loyalty-related information between the server 120 and merchant server (140), including for example, automated enrollment sign-up flow and/or loyalty notifications, as well as the automaton of the process involving exchange of reward points and creation of a user loyalty account. Such processes may be implemented in software, such as software modules, for execution by computers or other machines. The applications 123 may provide GUIs through which a user may view and interact with other components and devices within the system 100. The GUIs may be formatted, for example, as web pages in Hypertext Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 126 may be one or more databases configured to store data, including without limitation, one or more user identifying and/or financial accounts information, one or more merchant-specific transaction histories. The database 126 may comprise a relational database, a non-relational database, or other database implementations, and any combination thereof, including a plurality of relational databases and non-relational databases. In some examples, the database 126 may comprise a desktop database, a mobile database, or an in-memory database. Further, the database 126 may be hosted internally by the server 120 or may be hosted externally of the server 120, such as by a server, by a cloud-based platform, or in any storage device that is in data communication with the server 120. Database 126 may store processed user information (e.g., relating to user transactional behavior and purchasing patterns) compiled and computed by server 120 and/or user device 110.

The system 100 may include one or more networks 127. In some examples, the network 127 may be one or more of a wireless network, a wired network or any combination of wireless network and wired network, and may be configured to connect the user transmitting device 110, the server 120 and a merchant system/server 140. Database 126 and 130 may be connected to Server 120 and 140 via network 127 and/or via direct connections 131 and 132, respectively. The network 127 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 127 may include, without limitation, telephone lines, fiber optics, IEEE Ethernet 902.3, a wide area network, a wireless personal area network, a LAN, or a global network such as the Internet. In addition, the network 127 may support an Internet network, a wireless communication network, a cellular network, or the like, or any combination thereof. The network 127 may further include one network, or any number of the exemplary types of networks mentioned above, operating as a stand-alone network or in cooperation with each other. The network 127 may utilize one or more protocols of one or more network elements to which they are communicatively coupled. The network 127 may translate to or from other protocols to one or more protocols of network devices. Although the network 127 is depicted as a single network, it should be appreciated that according to one or more examples, the network 127 may comprise a plurality of interconnected networks, such as, for example, the Internet, a service provider's network, a cable television network, corporate networks, such as credit card association networks, and home networks. The network 127 may further comprise, or be configured to create, one or more front channels, which may be publicly accessible and through which communications may be observable, and one or more secured back channels, which may not be publicly accessible and through which communications may not be observable.

In some examples, communications between the user device 110, server 120 and the merchant server 140 may occur using one or more front channels and one or more secure back channels. A front channel may be a communication protocol that employs a publicly accessible and/or unsecured communication channel such that a communication sent to the user device 110, and/or the merchant server 140 may originate from a device that may not be initially known to the receiving device/system (e.g., user device 110 and/or merchant server 140). Front channel communications, from an unknown source, may be accepted by the merchant server 140 based on the sending device having the address (e.g., network address, Internet Protocol (IP) address) of the merchant server. For example, the server 120, upon identifying a merchant corresponding to user location, may provide applications 113 on user device 110 the IP address of a merchant server (e.g., a server associated with storing and managing of loyalty/reward information for a plurality of account holders) for the merchant being visited by the user to facilitate a communication, through, for example, network connection 133, between the user mobile/computing device (that may or may not have been previously detected/identified by the merchant server) and a merchant loyalty account server.

Another example of communication with an initially unknown device/source my involve proximity-based communication with a user mobile device 110 that is within a sensing range (e.g., pairing distance) of a Bluetooth beacon or any other suitable short-range reader/sensing device associated with a merchant location. In some embodiments short-range reader/sensing devices may be physically disposed at or around a merchant location/store. An example of a proximity-based communication link is depicted by wireless link 134 in FIG. 1.

Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. In some embodiments, communication link between user device 110 and server 120 may correspond to a secure back channel communication 135). Connections 131 and 132 may also correspond to secure back channel communication links, in accordance to some embodiments of the present disclosure. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
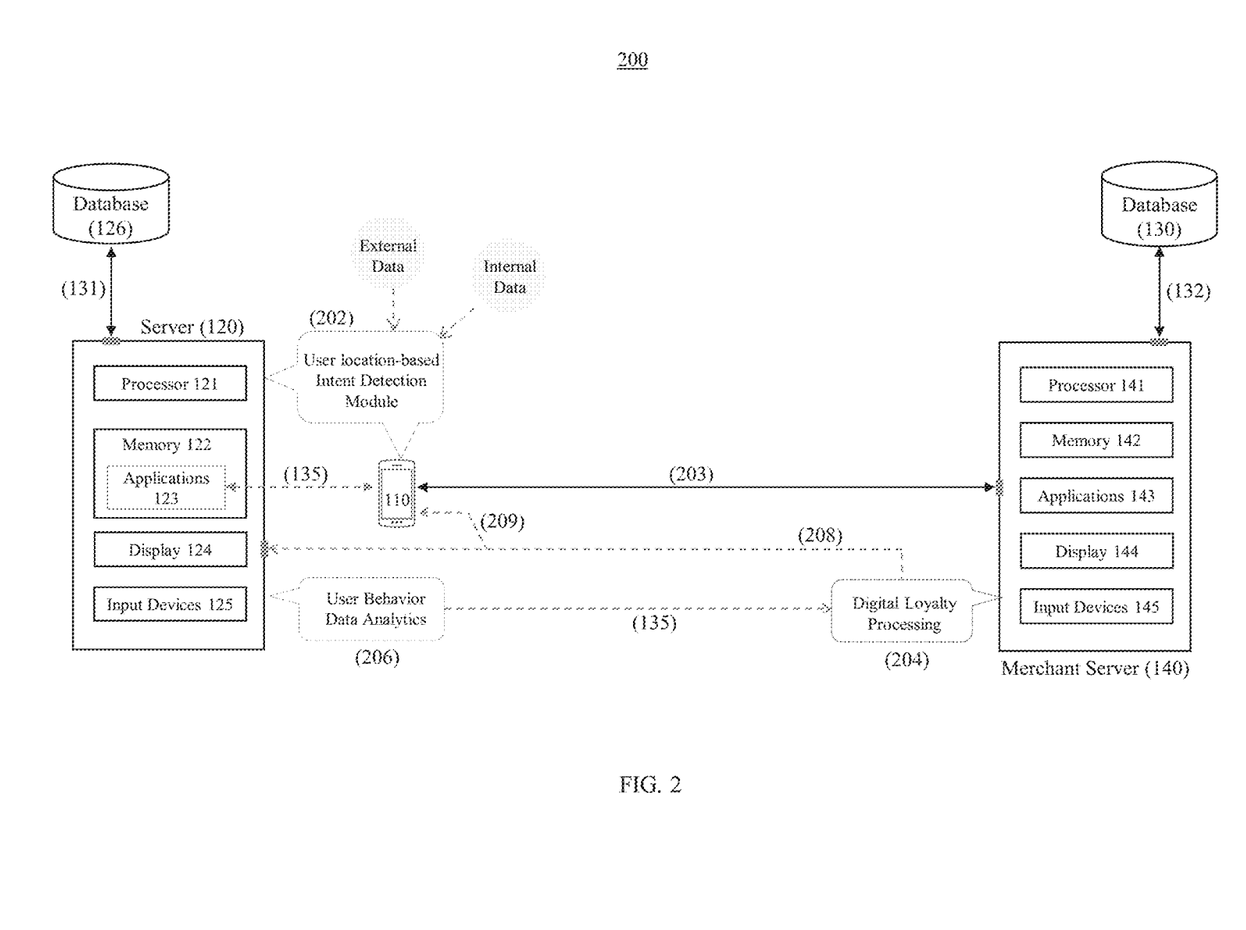
FIG. 2 is an exemplary operational diagram of a location-driven loyalty automation framework, in accordance to some embodiments of the present disclosure.

FIG. 2 illustrates one or more example process components of an automated event-driven loyalty processing system which may be triggered based on detection of one or more events. Some event, for example, may correspond to relevant user actions and/or activities that may be reliably determined based on user geographical location data, such as when a user is physically located at a known merchant location and the merchant location is known to offer one or more digital loyalty programs. Therefore, user geographical location may be used to predict one or more user actions. In FIG. 2, a user location detection module and/or process is shown that may be stored on, for example, on the user mobile device 110 and/or application server 120. For example, detection module and/or process may have some components that are stored and/or executed on a server (e.g., server 120) and some components that are stored and/or executed on a user device (i.e., user device 110).

Based on exemplary illustration 200, upon successful geographical mapping of the detected user location (e.g., to a merchant facility or service-location) as performed, for example, by automated process 202, a connection may be initiated (e.g., connection 203) to the appropriate merchant system (e.g., merchant server 140) associated with identified merchant location. Connection 203 may be established across network 127. Connection 203 may be initiated by the user device upon obtaining appropriate server connection information from server 120 which is communicatively coupled to it. A connection to the merchant system/server may also be initiated by the server 120 upon identifying corresponding merchant system and/or server connection information associated with a mapped merchant facility or service location (e.g., corresponding to a merchant facility or service location that geographically overlaps a detected user location). In the case of the latter, connection 203 corresponds to a communication pathway established between server 120 and 140. Information regarding known merchants with one or more loyalty programs and corresponding server connection information may be obtained from an internal and/or an external database (e.g., Database 126.)

According to some embodiments of the present disclosure, communication between Server 120 and merchant server 140 may take place across network 127. Loyalty related messages (e.g., electronic rewards related notifications, user authorization request and response messages for executing one or more actions) may be transmitted to the mobile device by the merchant server and/or application server (120) which receives the message across a communication session 203 established with the merchant server (e.g., server 140) across network 127. In some embodiments, merchant server 140 may directly send one or more notifications and rewards/loyalty related alerts to the user mobile device after user presence at the merchant location has been established.

In accordance to some embodiments, an affirmative response to a user authorization request may be required, prior to providing user identifying information to automate a loyalty account registration process. In some embodiments, an affirmative response to a user authorization request may also be required prior to providing processed user information (with marketing value for the merchant) in exchange for, for example, an better rewards and/or an upgraded loyalty status. Processed user information may also be used to create one or more user-customized loyalty programs. In some embodiment, processed user information may comprise qualitative and quantitative data regarding a user's transactional pattern and activity routine, and maybe based on an analysis of data from one or more mobile applications (such as a GPS application) and externally provided user transaction data associated with a range of financial instruments.

Digital loyalty processing may include operations such as identifying an existing loyalty account based on user identifying information provided by one or more applications running on a user mobile device (e.g., user device 110) and/or a corresponding application server (e.g., server 120). Digital loyalty processing may also comprise determination of loyalty rewards based on user-merchant interactions (e.g., transaction history, amount) and/or quantity and quality (from a marketing aspect) of the processed user information provided in connection with one or more merchant loyalty programs. Digital loyalty processing may further comprise transmission of merchant loyalty and rewards related messages, (illustrated, for example, by data path 208 in the example of FIG. 2.) Such messages may be provided, for example, via pop-up notifications or electronic alerts sent to a mobile application, or an email/text message sent to a registered user email address or phone number. Merchant loyalty/rewards related messages may be transmitted to server 120, as shown by data path 208. Server 110 will then receive the information, across its network connection with merchant server 140 and communicates the information to a corresponding application on user device 110 to be displayed to the user. In some embodiments, merchant loyalty and rewards related messages may be transmitted directly to a user mobile device (e.g., user mobile device 110), as shown by data path 209.

Referring back to FIG. 2, analysis of user behavior related data may be carried out, for example, by process block 206 running on server 120 as depicted in the exemplary embodiment 200. The analyzed user behavior data may, for example, comprise travel routes, transactional routines and purchasing patterns that may be obtained from an analysis internally and/or externally collected data associated with one or more electronically recorded and tracked user activities. Some non-limiting examples of internally collected data may include data from applications running on user mobile/computing device such as a GPS navigation application, and browser plugins that may be installed on a browser application, stored on user device, for tracking user's browsing patterns. Non-limiting examples of externally collected data may include transactional information provided by or retrieved from one or more financial account servers linked to one or more financial instruments associated with the user.

Processed user information generated by process block 206 may be of greater business value to a merchant from a marketing perspective. The higher marketing value of the provided (processed) user information may translate into greater loyalty bonus points and reward values offered by the merchant. In generating the processed user information, process bock 206 may perform one or more machine learning routine and data analytics operations on the internally and/or externally collected user behavioral and transactional data. The processed user information (as an output of process block 206) may be transmitted (i.e., along data path 210) to a digital loyalty processing block 240, running on merchant server 140. The processed user information transmitted in response to a detection of user's presence at a merchant location (e.g., by the automated process 202) may then be used by digital loyalty processing block 204 to determine an appropriate value for the loyalty offers and/or reward points to be assigned to the user. The loyalty-related information (i.e., the loyalty offers and/or reward points) may then be communicated to the user, via one or more electronic notifications transmitted to server 120, as shown by data path 208. Server 120 is communicatively coupled to user device 110 and can communicate relevant information to the user device via, for example, communication link 135. Communication link 135 may be established across network 127 or across a dedicated connection set up between server 120 and a corresponding application, running on user device 110.

Certain automated loyalty account-related actions may require user authorization and may only be allowed to proceed upon detection of a specific user input provided, for example, in response to an authorization request. User authorization input (e.g., captured with input devices 115 on user device 110) may then be provided to server 120 to enable the corresponding user-authorized action(s) to be automatically executed.

Figure 3:
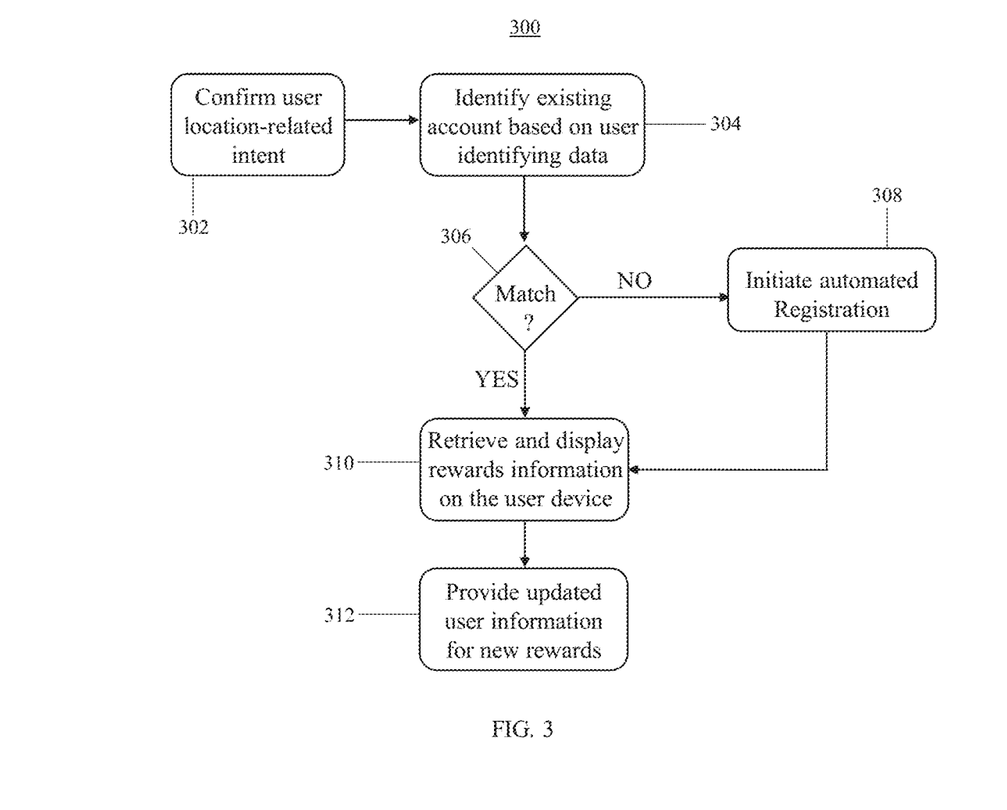
FIG. 3 is an exemplary flow diagram of an automated registration and notification process, in accordance to some embodiments of the present disclosure.

FIG. 3 provides an operational overview of an automated registration and notification process, in accordance to some embodiments of the present disclosure. Referring to FIG. 3, at (302) a user's location-related intent is determined based on an analysis of one or more internal data (e.g., Mobile GPS application data running on user's mobile phone) and external data (e.g., user's transactional activities and patterns provided by, for example, by one or more financial account servers associated with a user's financial portfolio.) For example, location-based intent, may be determined based on historical and real-time GPS navigation data and one or more concurrently recorded electronic activities that are in line with the GPS data indication as to the user's location-based intent. One example of such concurrently recorded electronic activities may correspond, for example, to a parking payment transaction initiated at or near a merchant location, or an electronic event corresponding to a short-range pairing of a user mobile device with a sensor/device installed at or near the merchant location. Such an electronic event may then be recorded and reported back to application server 120 by user device 110, and used to verify location-based intent of the user (e.g., visiting a merchant store.)

Once a user location-based intent has been determined and a communication link with the appropriate merchant server has been established, user identifying information (in a partial and/or a complete format) may be provided to verify if a loyalty account already exist for the corresponding user. This is illustrated by step 304. The verification process may involve a search, on the corresponding merchant system (e.g., merchant server 140 and/or database 130), for a data record matching the user identifying information. A matching process associated with a "YES" and a "NO" outcome indicating, respectively, an existing and no existing user loyalty accounts for the specific merchant, is illustrated by step 306.

If no matching entry is found on the corresponding merchant system, (i.e., corresponding to the "NO" outcome of the matching step 306), an automatic loyalty account registration process may be initiated at step 308 and the process may move onto determining a user's updated loyalty points (e.g., based on users transactional activity and/or processed user information with marketing value provided in exchange for reward/loyalty points.) If a loyalty account entry matching user's identifying information is found on the corresponding merchant system, (i.e., corresponding to the "YES" outcome of the matching step 306), the process may move to step 310. In some embodiments, the initiation of the registration process may require a user authorization response that may be obtained via for example an actionable notification sent to the user's mobile/computing device.

Once a user's presence has been established at an identified merchant store (e.g., step 302), and the appropriate merchant loyalty/reward processing server/device is identified (e.g., step 304), a communication channel may be set up to the corresponding merchant system to enable exchange of loyalty/related information between an application server associated with the user information (e.g., server 120) and corresponding merchant system (i.e., corresponding to steps 308, 310 and 312 in the exemplary flowchart 300). For example, step 308 may involve automated registration of a new user account and step 310 may be directed to communication of merchant-specific messages and notifications with a mobile user device, including, for example, message and notifications relating to loyalty and rewards. At step 312, processed user information (e.g., statistical data associated with user purchasing patterns and activity routines) may be computed and, contingent upon receiving an affirmative user authorization response, provided to the corresponding merchant system, for example, in exchange for a loyalty status upgrade or higher rewards points.

The application server may be communicatively coupled to a corresponding application running on the user mobile device. As such communication messages and loyalty related notifications from the corresponding merchant system may be conveyed to the application on the user device to be displayed to the user (e.g., step 310).

In some embodiments a communication channel may be set up to the appropriate merchant system/server to enable transmission of loyalty/rewards information from the merchant server, directly to the user mobile device.

Figure 4:
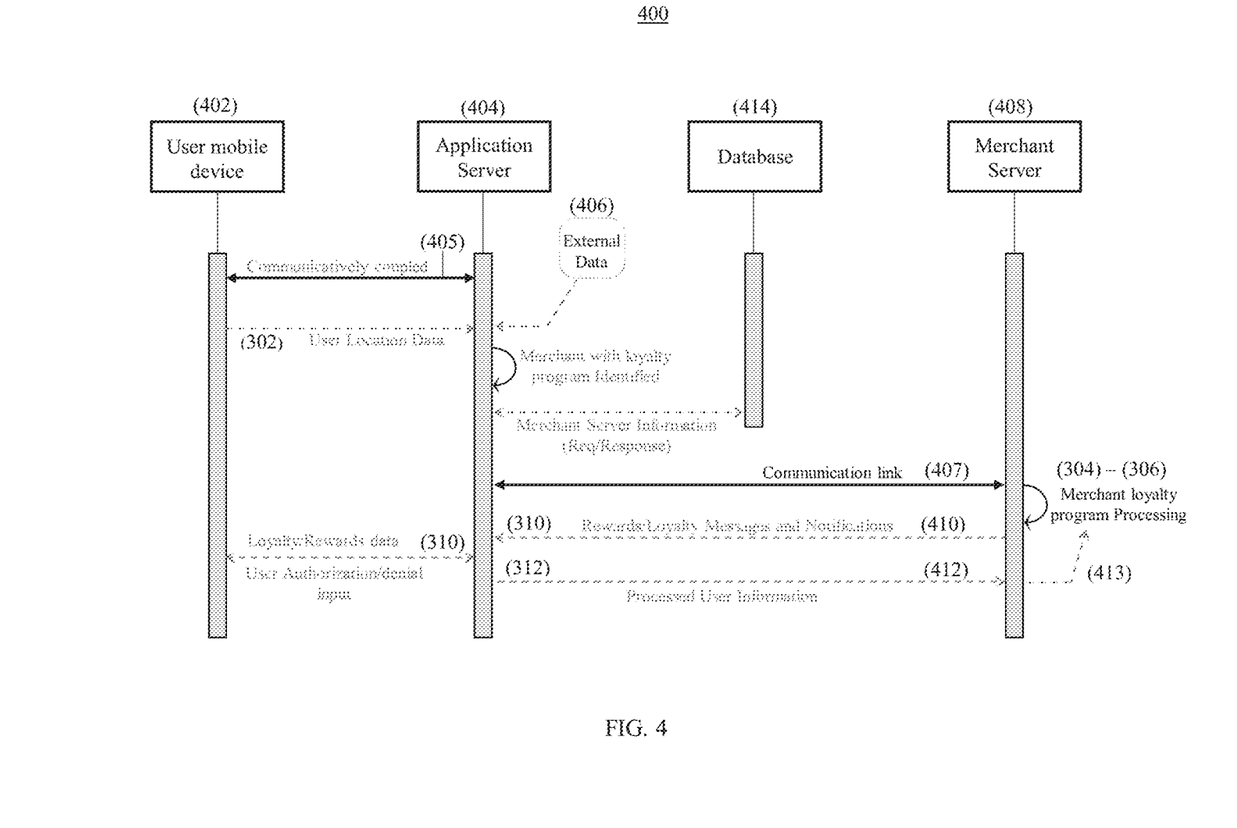
FIG. 4 is a sequence diagram relating to an automated registration and notification process, in accordance to some embodiments of the present disclosure.

FIG. 4 illustrates an exemplary sequence diagram 400 pertaining to the exemplary process shown in flowchart 300. For clarity, some operations/elements of the sequence diagram are annotated with a matching or similar step from flowchart 300. For example, step 302 which corresponds to the confirmation of user intent based on mapping user location to that of a merchant (with loyalty programs), is accomplished through communication between a user mobile device 402 and an application server 404 that may, for example, be running a loyalty automation application. The relevant data (e.g., user location data) may be transmitted across a communication channel 405 established between the user mobile device and application server 404. Application server 404 may perform one or more correlations between the data received from user mobile device 402 (e.g., data from one or more GPS and/or navigation-related applications stored on the user device) and external data 406 acquired, from example, from one or more distinct sources. An example of such distinct sources may comprise specific electronic terminals and systems processing respective user-conducted transactions (e.g., a parking system near the merchant location registering a parking transaction from the user, etc.). Another example of external data 406 may comprise wireless connectivity and pairing data recorded by ubiquitously disposed locational sensors (which may be provided to the application server by the user mobile device when in pairing or wireless connectivity range of the aforementioned sensors. The one or more correlations performed, for example, by application server 404 and/or user mobile device 402, may be based on timing and/or location of one or more recorded external events in relation to real-time and/or archived user location data.

Once a user's presence at a merchant location is established (e.g., step 302), application server 404 may establish a communication link 407 with a corresponding merchant server 408 which may be in charge of storing and processing of customer loyalty-related information. The processing of loyalty-related information may comprise identifying an existing loyalty account based on user identifying information (e.g., step 304, 306) which may be transmitted across communication link 407. The processing of loyalty-related information may further comprise transmission of relevant loyalty/reward related notifications and messages, corresponding, for example to data path 410, to application server (404). The aforementioned notifications and messages may then be retrieved by application server 404 and provided to user mobile device 402 to be displayed to the user (corresponding to step 310 on the flowchart 300). In some embodiments the relevant loyalty/reward related notifications and message may be directly transmitted to the user mobile device (e.g., user mobile device 402) by the corresponding merchant server (e.g., merchant server 408).

The processing of loyalty-related information may further comprise determining and/or updating a loyalty status of a user based on user purchase history and/or the processed user information received from a mobile device at the merchant location (e.g., user mobile device 110 or 402) and/or a corresponding application server (e.g., application server 120 or 404). This operation is depicted by data transfer 412 in the sequence diagram 400 and corresponds to step 312 in flowchart 300. The processed user information may then be used as input 413 in determining and/or updating the loyalty status of the user.

The relevant information regarding each known merchant (i.e., a merchant with a known facility or service location and one or more loyalty programs) may be stored by the application 404 that may be running, partially or fully, on the server 404 and/or user device 402. The relevant merchant information may also be stored on an external and/or an internal data repository such as database 414. The relevant merchant information may comprise information as to the rewards and/or loyalty programs being offered by the merchant. The relevant merchant information, with respect to merchants that do offer loyalty programs, may further include network connectivity information for connecting with an appropriate merchant-specific loyalty server/system.

Figure 5:
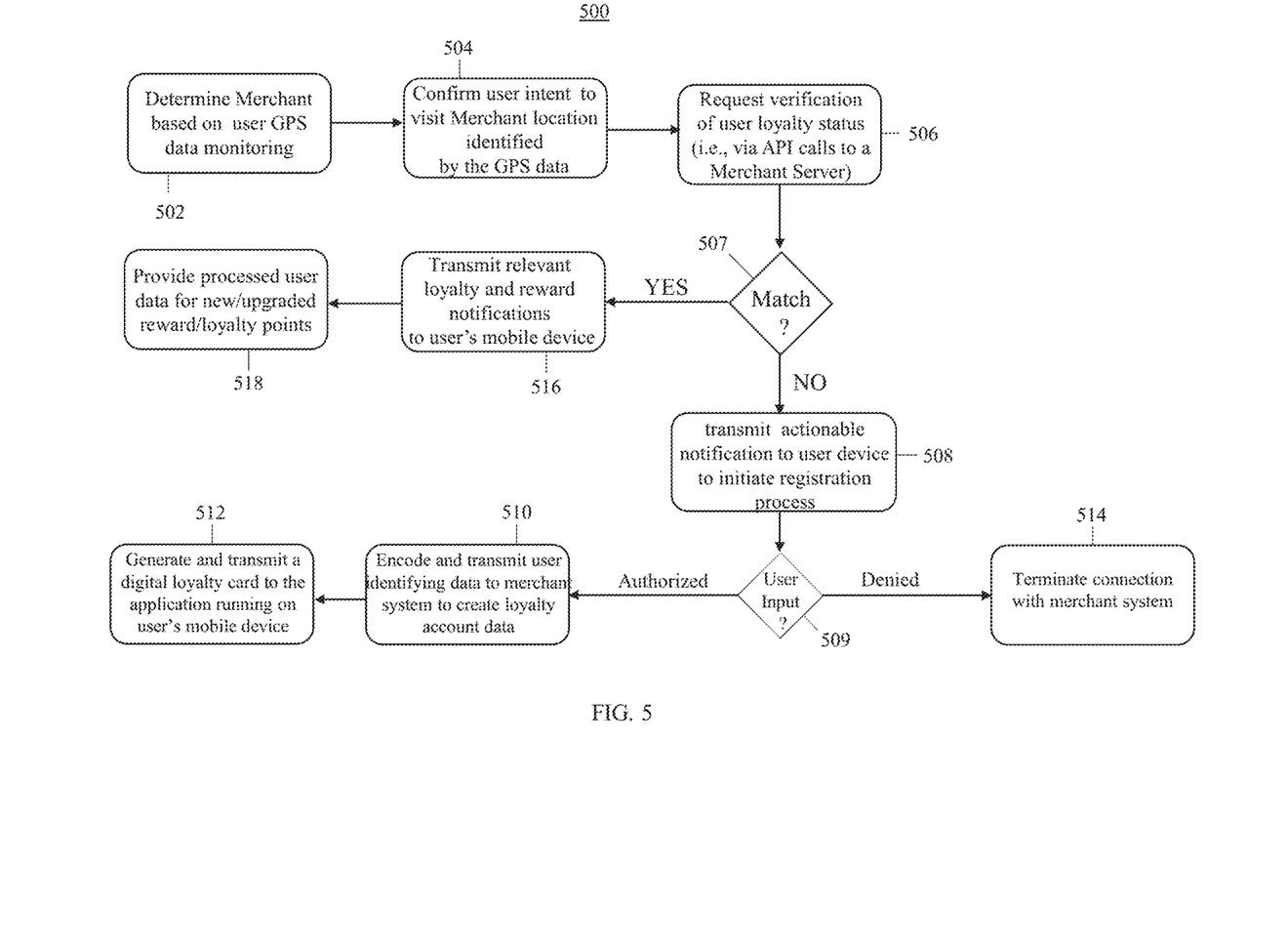
FIG. 5 is a flow diagram of an exemplary automated loyalty account generation and processing scheme based on a user's location-based intent, in accordance to some embodiments of the present disclosure.

FIG. 5 illustrates a flow diagram of an exemplary automated loyalty account generation and processing scheme with a dynamic response that is triggered upon detection of user's location-based intent. Referring to the flow diagram 500, at step 502 a merchant, being visited by the user, is identified. This may be accomplished, for example, by monitoring information generated by a Global Positioning System (GPS) application that may be stored on a user's mobile device. At step 504, a user's intent to visit the corresponding merchant location may be further confirmed based on externally collected contemporaneous, or near contemporaneous event data. Upon confirming the information generated by the GPS application as corresponding to an identified merchant location, a verification process may be initiated at step 506 to verify a user's loyalty status at the identified merchant (e.g., the merchant being visited by the user). The user's loyalty status may be verified using one or more API calls to a merchant server or database system. If a search in the appropriate merchant system/database reveals no matching entry for the user identifying information, an (actionable) notification may be generated in order to initiate an automated loyalty registration process. At step 508 the actionable notification may be transmitted to the user device. Upon receiving a user authorization response at step 509, the relevant user data (e.g., data required for registering a loyalty account) is encoded and transmitted to the appropriate merchant system for automatic creation of a loyalty account for the user. At step 512 a merchant-specific digital loyalty card is generated and transmitted to an application running on the user's mobile device. If instead of a user authorization response at step 509, a user denial response is detected, the connection to the merchant server may be terminated as shown by step 514.

In some embodiments, user identifying information may comprise approximate information such as an age range and a zip code associated with the user, to thereby protect user privacy and facilitate the identification of an existing user account without a full exposure of user identifying information.

Figure 6:
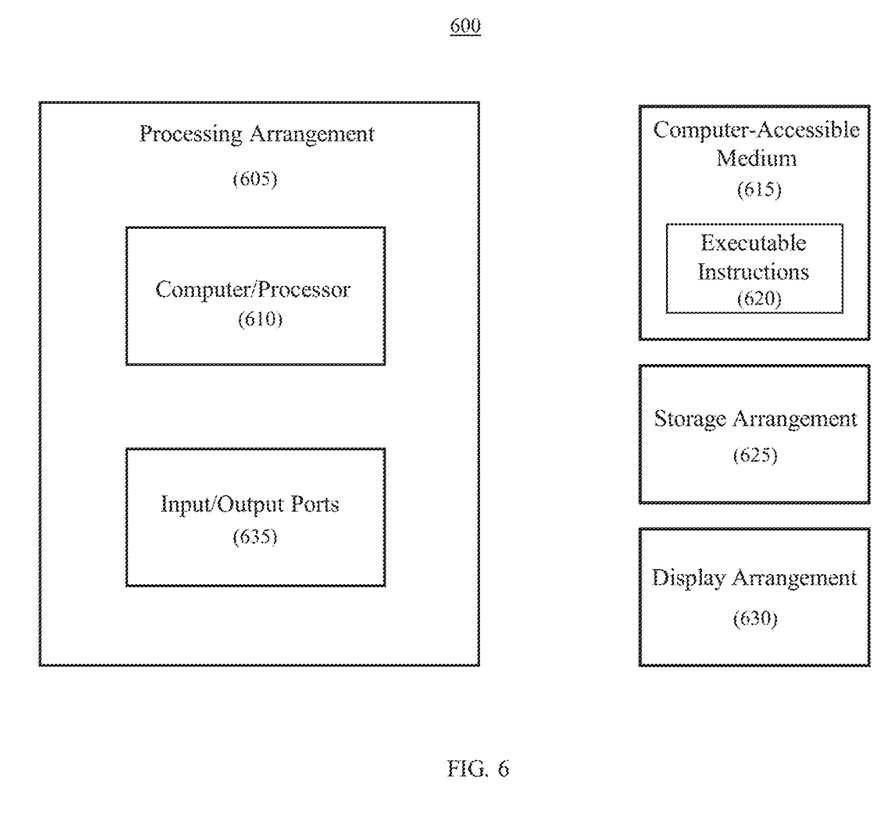
FIG. 6 is an illustration of an exemplary block diagram of an exemplary system, in accordance to some embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example.

Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

According to some embodiments, one or more data analytics and machine learning routines may be applied to supplement the computation of the processed user information as described above. This may be supplemented by a use of various prediction models such as ones that can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The exemplary system, method and computer-accessible medium can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The models described herein may be trained on one or more training datasets, each of which may comprise one or more types of data. In some examples, the training datasets may comprise previously collected data, such as data collected from previous uses of the same type of systems described herein and data collected from different types of systems. This, for example, may apply to user transactional activity analyzed in conjunction, for example, with navigation data from a user mobile device. In other examples, the training datasets may comprise continuously-collected data based on the current operation of the instant system and continuously-collected data from the operation of other systems (e.g., real-time tracking of electronic transaction data and the data from a user's GPS application.) In some examples, the training dataset may include anticipated data, such as the anticipated future travel pattern and purchasing action pattern, currently scheduled workloads, and planned future workloads, for the instant system and/or other systems. In other examples, the training datasets can include previous predictions for the instant system and other types of system and may further include results data indicative of the accuracy of the previous predictions. In accordance with these examples, the predictive models described herein may be training prior to use and the training may continue with updated data sets that reflect additional information.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for location-based digitally issued loyalty enrollment, the method comprising:
   interfacing with one or more navigation based applications running on a user mobile device;
   collecting global positioning data for the user mobile device from a Global Positioning System (GPS) associated with the one or more navigation based applications;
   comparing the global positioning data with at least one known merchant location;
   determining, based on the comparison, that the user mobile device has entered one of the at least one known merchant location;
   creating a digital pairing between the user mobile device and a Bluetooth or near field communication beacon placed within communication range of an entrance of the at least one known merchant location;
   confirming, based on a combination of the global positioning data and digital pairing, that the user mobile device has entered one of the at least one known merchant location;
   upon the mobile device entering the at least one merchant location based on the confirmation, providing a dynamic notification about merchant-specific loyalty status and reward points to the user mobile device, the dynamic notification comprising:
      receiving, from the user mobile device, a uniquely identifying data element, the uniquely identifying data element being partially obscured to protect sensitive user data;
      verifying loyalty status by using the uniquely identifying data element to search a corresponding merchant system using one or more Application Programming Interface (API) calls;
   upon finding no matching entries in the corresponding merchant system:
      generating an actionable notification for the user to initiate a registration process;
      encoding relevant user identifying data stored on one of the user's mobile device and a corresponding application server;
      transmitting encoded information to the corresponding merchant system for automatic creation of a loyalty account for the user; and
      generating a digital loyalty card, on behalf of the merchant, wherein the digital loyalty card is transmitted to the application running on the user's mobile device;
   upon identifying an existing entry in the corresponding merchant system, notifying the user via one or more notifications transmitted to the user's mobile device.

2. The method of claim 1, wherein determining the location of the merchant further comprises using one of a Bluetooth and a Near Field Communication (NFC) process on the user's mobile device to pair with a device disposed at the location of the merchant.

3. The method of claim 1, further comprising, collecting one or more parking payment transaction data from one or more parking systems in proximity of the merchant location and supplementing the global positioning data with the parking payment transaction data to improve a confidence level of the comparison the global positioning data with the at least one known merchant location.

4. The method of claim 1, wherein determining the location of the merchant being visited by the user further comprises processing of internal data, collected from one or more applications stored on the user's mobile device, using one or more machine learning and data analytics routines.

5. The method of claim 1, wherein the user is provided with an interface to enter registration information, registration information being transmitted to the corresponding merchant system to generate a user loyalty account.

6. The method of claim 1, wherein an initiation of the registration process is triggered by a user purchase at the merchant.

7. The method of claim 6, wherein a financial account server associated with a user purchase transmits an actionable notification to the user's mobile device regarding available loyalty programs at the merchant.

8. The method of claim 6, wherein the actionable notification to enable the user to initiate registration process, is generated by the financial account server associated with the user, the financial account sever transmitting one or more user identifying information to the merchant system to facilitate the registration.

9. The method of claim 8, wherein transmitting one or more user identifying information by the financial account server is contingent upon an affirmative authorization response from the user entered in response to an authorization request, the authorization request being sent, by the financial account server, to the application running on the user's mobile.

10. The method of claim 9, wherein the one or more user identifying information comprises approximate information comprising an age range and a zip code to thereby protect user privacy.

11. The method of claim 9, wherein the verification of a user's loyalty status at the merchant comprises matching one or more portions of a user identifying information to one or more records stored on the corresponding merchant system without a full exposure of user identifying information.

12. The method of claim 1, further comprising:
   monitoring information regarding online and in-person purchasing pattern of the user,
   wherein a loyalty score is generated based on information associated with online and in-person purchasing pattern of the user at the merchant relative to one or more transactional activities of the user conducted at one or more businesses competing with the merchant.

13. The method of claim 12, wherein the information regarding online and in-person purchasing pattern of the user is encoded and transmitted to the corresponding merchant system as part of the registration process for a user customized loyalty program.

14. The method of claim 1, wherein the verification of a user's loyalty status is further based on a frequency and an amount of past transactions conducted by the user at the merchant.

15. The method of claim 1, further comprising, analyzing recorded historical data before verifying loyalty status, wherein the historical data comprises user transaction history and historical user GPS data.

16. The method of claim 15, wherein verifying loyalty status is performed when the analysis of recorded historical data results in a threshold likeliness of an existing user loyalty account.

17. A system for automatic verification and generation of a merchant loyalty program based on a user location, the system comprising:
  a computer hardware arrangement configures to:
    Interface with one or more navigation based applications running on a user mobile device;
    collect global positioning data for the user mobile device from a Global Positioning System (GPS) associated with the one or more navigation based applications;
    compare the global positioning data with at least one known merchant location;
    determine, based on the comparison, that the user mobile device has entered one of the at least one known merchant location;
    create a digital pairing between the user mobile device and a Bluetooth or near field communication beacon placed within communication range of an entrance of the at least one known merchant location;
    confirm, based on a combination of the global positioning data and digital pairing, that the user mobile device has entered one of the at least one known merchant location;
    upon the mobile device entering the at least one merchant location based on the confirmation, provide a dynamic notification about merchant-specific loyalty status and reward points to the user mobile device, the dynamic notification comprising:
      receive, from the user mobile device, a uniquely identifying data element, the uniquely identifying data element being partially obscured to protect sensitive user data;
      verify loyalty status by using the uniquely identifying data element to search a corresponding merchant system using one or more Application Programming Interface (API) calls;
    upon finding no matching entries in the corresponding merchant system:
      generate an actionable notification to enable the user to initiate registration process;
      encode relevant user identifying data stored on one of the user's mobile device and a corresponding application server;
      transmit encoded information to the corresponding merchant system to automatically create a loyalty account for the user;
      generate a digital loyalty card, on behalf of the merchant, and transmit the digital loyalty card to an application running on the user's mobile device; and
    upon identifying an existing entry in the merchant database, notify the user via notifications transmitted to the user's device via the application.

18. The system of claim 17, wherein the computer hardware arrangement is further configured to verify the location of the merchant being visited by the user by using one of a Bluetooth and a Near Field Communication (NFC) process on the user's mobile device to pair with a device disposed at the merchant location.

19. The system of claim 17, wherein the computer hardware arrangement is further configured to determine the location of the merchant by applying one or more of machine learning and data analytics routines to the internally collected GPS data.

20. A non-transitory computer-readable medium comprising instructions for execution by a computer hardware arrangement, wherein, upon execution of the instructions the computer hardware arrange is configured to perform procedures comprising:
  interfacing with one or more navigation based applications running on a user mobile device;
  collecting global positioning data for the user mobile device from a Global Positioning System (GPS) associated with the one or more navigation based applications;
  comparing the global positioning data with at least one known merchant location;
  determining, based on the comparison, that the user mobile device has entered one of the at least one known merchant location;
  creating a digital pairing between the user mobile device and a Bluetooth or near field communication beacon placed within communication range of an entrance of the at least one known merchant location;
  confirming, based on a combination of the global positioning data and digital pairing, that the user mobile device has entered one of the at least one known merchant location;
  upon the mobile device entering the at least one merchant location based on the confirmation, providing a dynamic notification about merchant-specific loyalty status and reward points to the user mobile device, the dynamic notification comprising:
    receiving, from the user mobile device, a uniquely identifying data element, the uniquely identifying data element being partially obscured to protect sensitive user data;
    verifying loyalty status by using the uniquely identifying data element to search a corresponding merchant system using one or more Application Programming Interface (API) calls;
  upon finding no matching entries in the corresponding merchant system:
    generating an actionable notification for the user to initiate a registration process;
    encoding relevant user identifying data stored on the user's device;
    transmitting encoded information to the corresponding merchant system for automatic
    creation of a loyalty program for the user;
    generating a digital loyalty card, on behalf of the merchant, wherein the digital loyalty
    card is transmitted to the application running on the user's mobile device; and upon identifying an existing entry in the merchant database, notifying the user via one or more notifications transmitted to the user's mobile device.

21. The non-transitory computer-readable medium of claim 20, wherein the procedures further comprise generating a loyalty score based on monitoring information associated with online and in-person purchasing pattern of the user at the merchant, relative to transactional activity of the user conducted at one or more competing merchants.

22. The non-transitory computer-readable medium of claim 20, wherein the procedures further comprise utilizing information regarding a frequency and an amount of past transactions conducted by the user at the merchant to determine a user's loyalty status at the merchant.

\* \* \* \* \*